UNITED STATES PATENT OFFICE.

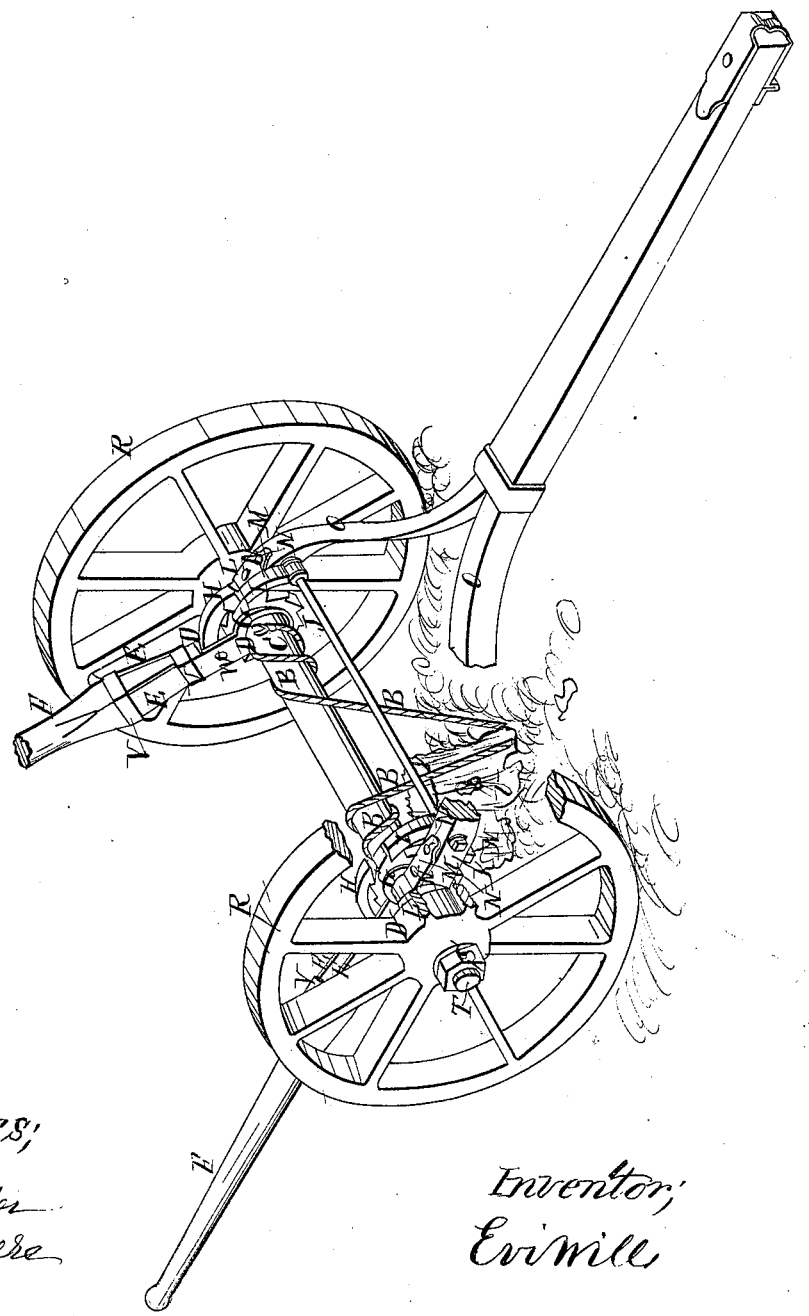

ERI WILLS, OF AUGUSTA, MAINE.

STUMP-EXTRACTOR.

Specification of Letters Patent No. 25,070, dated August 9, 1859.

*To all whom it may concern:*

Be it known that I, ERI WILLS, of Augusta, of the county of Kennebec, in the State of Maine, have invented an Improved Stump and Stone Extractor; and I do hereby declare that the following is a full and exact description of its construction and operation, reference being had to the accompanying drawings and to the letters of reference marked thereon, so as to enable others skilled in the art to make and use my improved device.

The drawings represent a perspective view of my machine, which consists of a frame O, O, tongue P, shaft A, two wheels R, R, ratchet device H, G, I, levers F, F, and rope or chain B.

The whole machine is supported by and moves on two large wheels R, R, which turn freely on the journals T, T, (only one visible in the drawings) of the shaft A, the wheels being held in place by means of nuts S, at the ends of the journals.

Bands M, bolted to the inner ends of the frame O, O, at N, N, pass around the ends of shaft A, inside of and close to the wheels R, R, as seen at L.

The lever frames consist of two parallel arms D E, D E, each, the two arms of each frame being held together by square bands V, V'. The space of the lever frames between the bands V, V', serves to receive the inner ends of the levers F, F, while the space between the lever frame arms and below the band V', leaves room for the play of the click H, which is arranged between the lever frame arms and pivoted to them at W. The lower ends of the lever frame arms are formed into rings which fit and may be moved around the shaft A, and between these rings there is a ratchet wheel G, keyed to the shaft A. Such a ratchet wheel and click are arranged between each of the two lever frames, and dogs I, I, one to each ratchet wheel, are pivoted to the frame O, O, as shown in the drawings, by means of a strong iron rod J, passing through both arms of the frame O, O, and fastened thereto by nuts K, at the ends of the rod and outside of the frame O, O, only one of these nuts being visible in the drawings.

The ends of the chain B, are hung to two hooks C, projecting from the shaft A, near the inside rings of the lever frames. The drawings show only one of these hooks.

The operation of the machine is as follows:

The horses or other animals having been hitched to the tongue P, the machine is drawn along, the wheels R, R, revolving upon the journals T, of the shaft A, until it has arrived over the stone or stump to be extracted. One end of the chain is then unhooked from the hook C, to which it was attached, and the middle portion of the chain is fastened around the stone or around one of the roots of the stump U, and then the end of the chain is hooked again to its hook C. Now the operators take hold of the outer ends of the levers F, F, and pass them forward, the clicks sliding over the teeth of the ratchet wheels during this movement of the levers. But when the operators commence to draw the levers back then the hooked ends of the clicks take into the teeth of the ratchet wheels and cause the ratchet wheels and with them the shaft A to turn backward together with the lever frame until the outer ends of the levers have been turned backward and downward as far as convenient when the lever motion is reversed again, the clicks sliding over the teeth of the ratchet wheels until the levers have been brought into the position already described when their backward movement commences again, thereby giving the shaft A, another turn.

It will be seen that each turn of the shaft A, winds up part of the chain and consequently serves to gradually lift the stone or stump out of the earth. During the forward motion of the levers the dogs I, I, take into the teeth of the ratchet wheels and thus keep the ratchet wheels and shaft from turning forward and the chain from unwinding during the said forward motion of the levers. During the backward motion of the levers the dogs I, I, slide over the teeth of the ratchet wheels.

It will be observed that the chain is represented as being passed underneath the object to be lifted, but when it is desired to remove the stump or stone directly from the field, then the chain is passed one or more times around the same so that as soon as it has been raised sufficiently high it can be conveyed at once and without any further interruption to the place of deposit.

In some cases it may be found desirable to employ the animals by which the machine is drawn to assist in loosening or starting a stump or stone. In such cases after the chain has been properly secured to the stump or stone, the animals are unhitched from the tongue P, which is then to be elevated so that the end will be somewhat above the axle A, after which the animals are taken to the rear of the machine and hitched to the elevated end of the tongue by means of a long chain, when the tongue is drawn up and over backward and thus the whole power of the team is exerted to loosen and lift the stump or stone, since the dogs I, I, take into the ratchet wheels G, G, which are made fast to the shaft A, upon which the chain is wound.

Having described my improved stump and stone extractor, what I claim as new and desire to secure by Letters Patent, is:

The combination of the frame O, O, tongue P, and shaft A, with the wheels R, R, ratchet device H, G, I, levers F, F, and chain B, constructed and arranged in relation to each other as and for the purposes set forth.

ERI WILLS.

Witnesses:
  Jos. Miller,
  J. W. Thackara.